US012134395B2

(12) United States Patent
Zhang

(10) Patent No.: US 12,134,395 B2
(45) Date of Patent: Nov. 5, 2024

(54) REMOTELY SUPERVISED PASSENGER INTERVENTION OF AN AUTONOMOUS VEHICLE

(71) Applicant: Beijing DiDi Infinity Technology and Development Co., Ltd., Beijing (CN)

(72) Inventor: Jiang Zhang, San Jose, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 191 days.

(21) Appl. No.: 17/552,308

(22) Filed: Dec. 15, 2021

(65) Prior Publication Data

US 2022/0105951 A1 Apr. 7, 2022

Related U.S. Application Data

(63) Continuation of application No. 16/457,668, filed on Jun. 28, 2019, now Pat. No. 11,225,262.

(51) Int. Cl.
*B60W 50/10* (2012.01)
*B60W 50/00* (2006.01)
(Continued)

(52) U.S. Cl.
CPC .......... *B60W 50/10* (2013.01); *B60W 50/087* (2013.01); *B60W 50/14* (2013.01); *G05D 1/0016* (2013.01); *G05D 1/0061* (2013.01); *H04L 63/0823* (2013.01); *B60W 2050/0075* (2013.01); *B60W 2050/0083* (2013.01); *B60W 2050/146* (2013.01); *B60W 2520/06* (2013.01); *B60W 2520/10* (2013.01);
(Continued)

(58) Field of Classification Search
CPC ................. B60W 50/10; B60W 50/14; B60W 2050/0075; B60W 2050/0083; B60W 2050/146; B60W 2520/06; B60W 2520/10; B60W 2556/45; H04L 63/0823
See application file for complete search history.

(56) References Cited

U.S. PATENT DOCUMENTS 9,772,626 B2 9/2017 Bendewald et al.
10,328,897 B1 * 6/2019 Nabbe ..................... G06F 21/44
(Continued)

OTHER PUBLICATIONS

Dumitru Daniel Dinu and Mihai Togan, DHCP Server Authentication using Digital Certificates, 2014, IEEE (Year: 2014).
(Continued)

*Primary Examiner* — Dale W Hilgendorf
*Assistant Examiner* — Hana Lee
(74) *Attorney, Agent, or Firm* — Sheppard Mullin Richter & Hampton LLP

(57) ABSTRACT

Methods, systems, and apparatus, including computer programs encoded on computer storage media, for managing user intervention for a vehicle are provided. One of the methods includes: receiving an instruction to initiate an intervention session from a server, and providing, in response to receiving the instruction, a user interface associated with the intervention session for display on a terminal associated with the vehicle. The method further includes detecting, at the terminal, a user interaction corresponding to a command associated with operation of the vehicle, and generating a decision associated with the operation of the vehicle based at least in part on the command.

20 Claims, 7 Drawing Sheets

(51) Int. Cl.
*B60W 50/08* (2020.01)
*B60W 50/14* (2020.01)
*G05D 1/00* (2024.01)
*H04L 9/40* (2022.01)

(52) U.S. Cl.
CPC ....... *B60W 2556/45* (2020.02); *G05D 1/0088* (2013.01); *G05D 1/0276* (2013.01)

(56) References Cited

U.S. PATENT DOCUMENTS

| | | | | |
|---|---|---|---|---|
| 2008/0266051 | A1* | 10/2008 | Taki | G07C 5/008 |
| | | | | 340/5.1 |
| 2012/0296512 | A1* | 11/2012 | Lee | H01M 10/486 |
| | | | | 701/29.3 |
| 2015/0279125 | A1* | 10/2015 | Chronowski | G07C 5/008 |
| | | | | 701/29.2 |
| 2017/0011561 | A1* | 1/2017 | Makke | B60T 17/221 |
| 2018/0095457 | A1* | 4/2018 | Lee | G08G 1/09623 |
| 2019/0011907 | A1 | 1/2019 | Park et al. | |
| 2020/0204371 | A1 | 6/2020 | Chengalvala et al. | |

OTHER PUBLICATIONS

Non-Final Office Action dated Mar. 25, 2021, issued in related U.S. Appl. No. 16/457,668 (19 pages).
Final Office Action dated Jul. 29, 2021, issued in related U.S. Appl. No. 16/457,668 (20 pages).
Notice of Allowance dated Sep. 14, 2021, issued in related U.S. Appl. No. 16/457,668 (8 pages).

* cited by examiner

REMOTELY SUPERVISED PASSENGER INTERVENTION OF AN AUTONOMOUS VEHICLE

CROSS-REFERENCE TO RELATED APPLICATIONS

This application is a continuation of U.S. patent application Ser. No. 16/457,668, filed Jun. 28, 2019. The entire content of the above-identified application is incorporated herein by reference.

TECHNICAL FIELD

The disclosure generally relates to autonomous vehicles, particularly to remote intervention for the autonomous vehicles.

BACKGROUND

An autonomous vehicle may be capable of sensing its environment and automatically move with little or no human input. Due to limitations to the capabilities of an autonomous vehicle, especially when unpredictable environmental conditions occur, assistance and intervention of humans may be required for smooth operation of the vehicle. Currently, remote intervention for autonomous vehicles may be implemented between a server-side operator and a vehicle. Via a network connection with the vehicle, the operator may provide commands or information input to assist the automated driving of the vehicle.

However, because of network latency and bandwidth limitations as well as the geographical separation, the operator may not have the best knowledge of real-time information of the environment and status of the vehicle. Decisions made by the operator may not be optimal. The vehicle may not achieve optimal performance with the assistance of the remote operator.

In the scenario when an autonomous vehicle is used by a ride-sharing system as a passenger carrier, the passenger may have special requests that may be hard to describe or explain to the remote operator. At the same time, the passenger may be experienced in driving and be familiar with the surrounding environment of the vehicle. Although it may be beneficial to allow the passenger to intervene the operation of the vehicle in this case, the intervention of the passenger may give rise to various security and safety concerns (e.g., burglar, carjacking, unsafe driving behavior of a DUI driver or aggressive driver).

Therefore, there is need for a system that allows a passenger to provide assistance or intervention to the operation of an autonomous vehicle, while keeping the ultimate control over the vehicle in the hands of a trusted operator.

SUMMARY

One aspect of the present disclosure is directed to a method for managing user intervention for a vehicle. The method may comprise receiving an instruction to initiate an intervention session from a server and providing a user interface associated with the intervention session for display on a terminal associated with the vehicle, in response to the received instruction. The method may further comprise detecting a user interaction corresponding to a command associated with operations of the vehicle at the terminal, and generating a decision associated with the operations of the vehicle based at least in part on the command.

In some embodiments, the user interaction may include a user-level command for operating the vehicle. The generation of the decision may include sending the user-level command and sensor data collected by one or more sensors associated with the vehicle to a server; receiving, from the server, a server command that overrides the user-level command; determining, based on the sensor data and the server command, an updated command for operating the vehicle that overrides the server command; and generating, based on the updated command for operating the vehicle, a bus-level command for operating the vehicle.

In some embodiments, the method may further include receiving, at the terminal, a user input comprising a request for initiating the intervention session and forwarding, to the server, the request and information associated with a status of the vehicle. An intervention session may be initiated after this request is approved by the server.

In some embodiments, the command may include instructions associated with a movement direction of the vehicle, instructions associated with a speed of the vehicle, or instructions associated with a destination for navigation of the vehicle.

In some embodiments, a state flag that indicates the user intervention is authorized may be enabled in response to the received instruction.

In some embodiments, the method may further include forwarding the command to the server in response to the detecting.

In some embodiments, the decision associated with the operations of the vehicle may be generated further based on data collected by one or more sensors associated with the vehicle.

In some embodiments, updated information associated with a status of the vehicle as a result of the decision may be obtained, sent to the server, and provided for display in the user interface.

In some embodiments, a user input comprising a request for terminating the intervention session may be received at the terminal. The intervention session may be terminated in response to the received user input, and a state flag that indicates user intervention is authorized is disabled. A report may be sent to the server indicating that the intervention is terminated.

In some embodiments, the method may further include receiving a command associated with operations of the vehicle from the server, and updating the decision based at least in part on the command from the server. The command from the server may have higher priority than the command corresponding to the user interaction; the command from the server may be able to override the command corresponding to the user interaction.

In some embodiments, the method may further include receiving a command to terminate the intervention session from the server and terminating the intervention session in response to the command from the server. The terminating may include disabling a state flag that indicates user intervention is authorized.

In some embodiments, the instruction may include a digital certificate for verifying the identities of the server or the user.

Another aspect of the present disclosure is directed to a system for managing user intervention for a vehicle. The system may comprise one or more processors and a memory storing instructions. The instructions, when executed by the one or more processors, may cause the system to perform: receiving an instruction to initiate an intervention session from a server, providing a user interface associated with the intervention session for display on a terminal associated with the vehicle, in response to the received instruction, detecting a user interaction corresponding to a command associated with operations of the vehicle at the terminal, and generating a decision associated with the operations of the vehicle based at least in part on the command.

Another aspect of the present disclosure is directed to a non-transitory computer-readable storage medium configured with instructions executable by one or more processors to cause the one or more processors to perform operations. The operations may include receiving an instruction to initiate an intervention session from a server, providing a user interface associated with the intervention session for display on a terminal associated with the vehicle, in response to the received instruction, detecting a user interaction corresponding to a command associated with operations of the vehicle at the terminal, and generating a decision associated with the operations of the vehicle based at least in part on the command.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Figure 1:
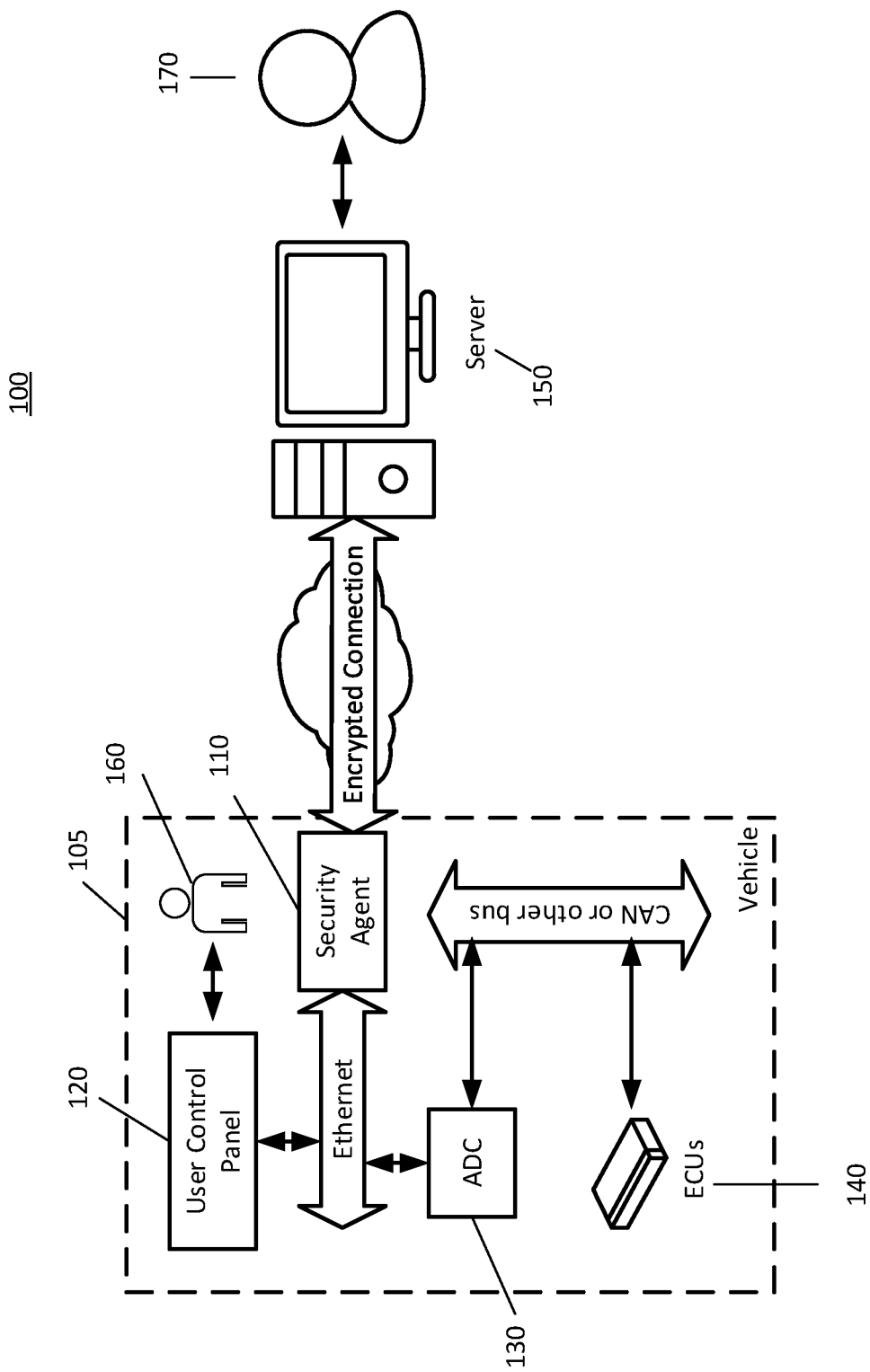
FIG. 1 illustrates an architecture of a remotely supervised passenger intervention system.

Specific, non-limiting embodiments will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of this specification. Various changes and modifications obvious to one skilled in the art to which the specification pertains are deemed to be within the spirit, scope and contemplation of the specification as further defined in the appended claims.

Autonomous vehicles may experience problems during navigation because of unexpected scenarios (e.g., road closures or detours due to constructions, events, or accidents) or an outdated map. In other situations, a new or unmarked road or the destinations (i.e., such as a new community) may not be included in the map, or its address may not be accurately or clearly marked in the map. A remote operator may not be able to provide prompt assistance because of the limited information regarding the surrounding environment of the vehicle. However, a passenger in the vehicle may be more familiar with the destination or able to observe real-time information regarding the surrounding environment.

Some embodiments of this specification provide a remote intervention system that allows a passenger to assist the operation of an autonomous vehicle, while enabling a remote operator to intervene or control the vehicle when necessary. The system may overcome the communication delay or network bandwidth limitations for remote intervention, provide prompt human control/intervention even when the vehicle moves fast, and allow the vehicle to navigate to the desired destination safely and accurately.

In some embodiments, either a passenger or a remote operator may request to initiate an intervention session for an autonomous vehicle. If the passenger wants to gain control over the vehicle, the passenger can send an intervention session request to a server, which may verify the passenger's eligibility and initiate the intervention session if eligible. If the remote operator believes that the passenger may provide assistance, the remote operator can initiate the intervention session and instruct the passenger to use the remote intervention system. The operations of such an intervention system by the passenger may be intuitive and easy to learn.

During an intervention session, a passenger may send commands to the vehicle using a user interface. For example, the passenger can use the icons of Forward, Backward, Left, Right and Stop on an iPad as the control panel to instruct the vehicle navigate to a desired destination. While changing the moving directions of the vehicle, those icons may adjust the speed of the vehicle, for example, the Forward instruction may also accelerate a forward speed of the vehicle, or decelerate a backward speed of the vehicle. The passenger can also change the speed of the vehicle by adjusting a speed icon on the control panel. The icons on the control panel may be embedded in the background of a navigation map. For example, the icons may be set in the background of the map at the current vehicle location. The user may update the destination by typing in a new address or dropping a pin on the map that is shown on the control panel. Additionally, the user may zoom the map in or out by pressing the control panel. Or the passenger can use other methods, such as a voice command, to instruct the vehicle. For example, the user can use voice command to enter a new destination address.

In the meantime, the remote operator can monitor the behaviors of the passenger to ensure the operations of the vehicle are safe. If the passenger made any unsafe command, the remote operator can override the passenger's command or even take over the control of the vehicle. Once the vehicle overcomes a difficulty that obstructs the vehicle's operations, either the user/passenger or the remote operator may terminate the intervention session and switch back to the autonomous driving mode, in which the passenger cannot intervene the vehicle's operation anymore.

Particular embodiments disclosed herein provide the passenger flexibility to assist the navigation of an autonomous vehicle. The passenger can conveniently guide the autonomous vehicle to where he/she wants to go using a user-friendly and easy-to-operate interface. Particular embodiments ensure the safety and security of the passenger and vehicle by limiting user commands to high-level commands. An autonomous driving system (ADS) processes the user commands and generate low-level control commands (e.g., controller area network (CAN) bus commands) using predetermined algorithms that take into consideration sensor data about the surroundings of the vehicle.

In some embodiments, the passenger's intervention may be supervised by the remote operator. If any of the operations from the passenger is unsafe, the remote operator can override the operation or take over the vehicle's control at any time. Since it is possible that the passenger knows the real time environment or the destination better than the remote operator as the remote operator may only know the driving environment via the sensors of the vehicle, the passenger may be able to guide the vehicle to a better route or more accurately to the destination. If encounters any dangers, the passenger may react faster than the remote operator. However, if the passenger does something undesirable, the remote operator can still react immediately to control the vehicle. In case the passenger is unable or not willing to guide the vehicle, the vehicle can fall back to the regular remote intervention. Therefore, the passenger assisted mode is a good supplement to remote intervention by an operator.

FIG. 1 shows an architecture of a remotely supervised passenger intervention system. The remotely supervised passenger intervention system 100 may comprise a vehicle 105 and a server 150 associated with a remote operator 170. The vehicle 105 may include a security agent 110, a terminal (e.g., a user control panel 120), an autonomous driving controller (ADC) 130, one or more electrical control units (ECUs) 140, an ethernet interface and a CAN bus connecting the components of the vehicle 105. The vehicle 105 may carry a passenger 160. The vehicle 105 may communicate to the server 150 through a secured connection, such as an encrypted connection. The remote operator 170 may monitor the behavior of the vehicle 105 and intervene the operation of the vehicle 105 through the server 150 when it is necessary.

Figure 2:
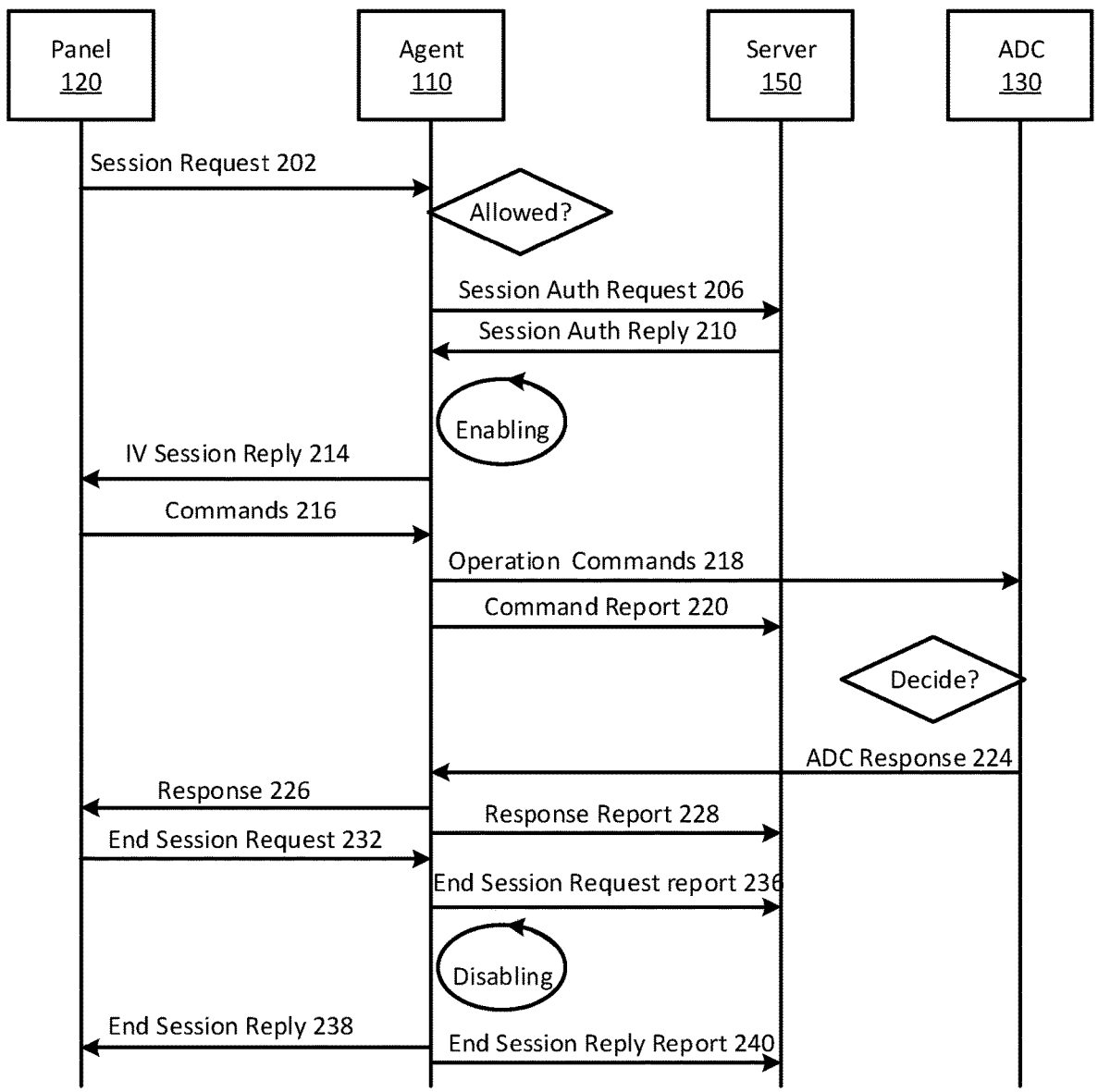
FIG. 2 illustrates a flow chart of a passenger requested intervention session.

FIG. 2 shows a flow chart of a passenger requested intervention session. In some embodiments, when the passenger 160 wants to intervene the operation of the vehicle 105, such as controlling the vehicle 105 to navigate in an area that is not mapped on a high definition (HD) map accurately, the passenger 160 may send an intervention session request 202 for remote intervention to the security agent 110. The request may be entered at a terminal, i.e., by pressing a "start" icon on the user control panel 120, by voice commend through a built-in microphone, or any other suitable methods through any other devices. The security agent 110 may receive the user input including the intervention session request 202 on the user interface at the terminal.

After the security agent 110 receives the intervention session request 202, the security agent 110 may review the received intervention session request 202 and check a current state flag for intervention sessions to determine whether the passenger 160 is already allowed to establish an intervention session under the current vehicle status. Along with the intervention session request 202, the passenger 160 may provide a digital key, a security code, a password, or a fingerprint in the intervention session request 202, to let the security agent 110 or the SOC to authenticate the passenger 160 who is requesting to establish a remote intervention session. If the passenger 160 has signed in before sending the intervention session request, the security agent 110 may have authenticated the identity of the passenger 160 during signing into the vehicle. If the security agent 110 determines that the passenger 160 has already established an intervention session or the state flag that indicates the user intervention is authorized, it may directly use the intervention session to take commands from the passenger 160. If the security agent 110 determines that the passenger 160 currently has not established a remote intervention session, the security agent 110 may forward the received intervention session request 202 and the information associated with the current vehicle status to the server 150 by sending an intervention session authorization request 206 to the server 150 (e.g., a security operation center (SOC)). The intervention session authorization request 206 may comprise the received intervention session request 202 (including the digital certificate of the vehicle) and the information associated with the current vehicle status. The server 150 may evaluate the received intervention session authorization request 206 and other vehicle information or user profile who has checked into the vehicle to decide whether to authorize the intervention operation for the passenger 160. For example, the passenger profile may indicate whether the passenger has sufficient experience to drive under the current road condition. The other vehicle information may include the vehicle speed, images/videos captured by the vehicle cameras, information collection by various sensors of the vehicle, location/orientation of the vehicle, or other conditions of the vehicle. For example, if the vehicle 105 is currently driving on a winding mountain road in the evening with an unexperienced young driver, the SOC may not authorize the intervention session authorization request 206.

If the SOC authorizes the intervention session authorization request 206, the SOC may send an intervention session authorization reply 210 to the security agent 110 to allow the security agent 110 to establish the remote intervention session for the passenger 160, and the SOC may start monitoring the intervention operations. If the SOC decide not to authorize the intervention session, the intervention session authorization reply 210 may notify the security agent 110 to reject the intervention session request 202. The communications between the server 150 and other parties in the system are through a secured encrypted connection, to prevent undesired interruptions, such as interruptions from hackers. The intervention session authorization reply 210 may comprise an instruction to initiate the intervention session. The intervention session authorization reply 210 may comprise a digital certificate for the security agent 110 to authenticate the identity of the server 150. Alternatively, the authentication of the server 150 may have been completed when the secure encrypted communication channel between the security agent 110 and the server 150 was established.

The intervention session with the passenger 160 may be established and the security agent 110 may send an intervention session reply 214 to the passenger 160. The security agent 110 may provide a user interface associated with the intervention session based on the received instruction from the server 150, for display the intervention session reply 214. The user interface may be provided on various devices, such as on the terminal associated with the vehicle 105 (e.g., user control panel 120 or passenger's mobile device application). Meanwhile, a state flag may be set to indicate that the intervention session is authorized and enabled in response to the received intervention session authorization reply 210. The intervention session reply 214 may be sent to the user control panel 120 to notify the passenger 160 that the intervention session request 202 has been authorized, so that the passenger 160 can start sending commands 216 to the security agent 110, wherein the commands 216 may include authentication information and high level commands, such as turning left/right, moving forward/backward, accelerating/decelerating, or stop. The user interface may be provided on the user control panel 120 for displaying the intervention session reply 214 or for entering the high-level commands. The user interface may be provided on other devices, such as video devices, audio devices, or any other suitable devices.

The commands 216 may be a single command or a plurality of commands in a specified sequence. The commands 216 may include a command for changing destination, changing route, or any other types of command that may control the operation of the vehicle 105. For example, the passenger 160 may change the current destination by a cancellation command cancelling the current route, followed by entering a new point of interest on the user control panel 120. Or the passenger 160 may change navigation options from a fastest route to a local street route. The changes may be due to road blockage caused by a very recent accident, which has been observed by the passenger 160 but has not been detected by the vehicle 105 or the remote operator 170. For another example, the changes may also due to inaccurate location information on the map and the passenger needs to correct the route. The passenger 160 may realize that the vehicle 105 has passed the desired destination, and would like the vehicle 105 to go back. In this scenario, the passenger 160 may send a "back" command by pressing a "backward" icon on the user control panel 120 to navigate the vehicle 105 to go back to the desired location. Once the vehicle 105 arrives at the desired location, the passenger 160 may send a "stop" command by pressing a "stop" icon on the user control panel 120. The commands 218 may include a "back" command followed by a "stop" command.

The security agent 110 may detect the user input and forward the user interaction, such as operation commands 218, to the ADC 130 of the vehicle 105, and create and send a command report 220 to the server 150 at the SOC. The command report 220 may comprise the command inputted by the user. The operation commands 218 may be a portion of the commands 216 that contains the high level commends for directing the vehicle 105. The command report 220 may include the operation commands 218 and the information associated with the vehicle status. The ADC 130 may make a decision associated with the operation of the vehicle 105 based on the received operation commands 218, other information collected by the sensors of the vehicle 105, and information associated with the vehicle's current status. The other information may include environment information (i.e., light, visibility, obstacles, etc.,) speed, direction, elevation, or orientation of the vehicle 105, and/or weather information (i.e., snow, rain, wind, etc.). If the ADC 130 decide to follow the received operation commands 218, it may convert the received high level operation commands 218 to corresponding low level CAN bus commands and send the low-level CAN bus commands to the ECUs 140 to operate the vehicle 105. The ADC 130 may communicate with the ECUs 140 through the CAN bus or any other bus. If the ADC 130 decide that it is not safe to follow the commands 218, the ADC 130 may reject the operation commands 218. For example, if the passenger 160 realizes that the vehicle 105 has passed the destination, the passenger may send a "back" command to the ADC 130 and direct the vehicle to take a U-turn at the next intersection. However, the ADC 130 may decide that it is unsafe for the U-turn because of the current vehicle speed and the distance to the next intersection, and then reject the U-turn command. The ADC 130 may also choose an alternative action for the vehicle 105 based on an aggregation of the available information. Continuing the previous example, the ADC 130 may instruct the vehicle to make a detour around a block to achieve the effect of a U-turn.

After the ADC 130 made the final decision, it may send an ADC response 224 to the security agent 110 to notify the security agent 110 about the vehicle's operations together with the updated status of the vehicle 105. The security agent 110 may forward at least a part on the information in the ADC response 224, such as a response 226, to the passenger 160, and creates and sends a response report 228 to the SOC. The response 226 may be shown on the user control panel 120 to notify the passenger 160 that the operation commands 218 are approved or rejected by the ADC 130. The updated status information of the vehicle 105 (i.e., the speed, location, orientation) may also be shown on the user control panel 120. The response report 228 may comprise at least the ADC response 224 and/or the vehicle current status information.

The passenger 160 may review the response 226 and the vehicle current status on the user control panel 120. Alternatively, the response 226 may be delivered to the passenger 160 by voice through a speaker in the user control panel 120 or the vehicle 105, or in any other suitable methods. The passenger 160 may evaluate the response 224 and the vehicle current status to decide his next action. For example, in the above scenario, if the ADC 130 authorizes the vehicle to take the U-turn, the passenger may send a next command "stop" when the vehicle arrives at the desired destination. If the U-turn command is rejected by the ADC 130, and the passenger realizes no U-turn opportunity in the next few intersections, the passenger may send a "right" command to turn right at the next intersection, and subsequent commands to go back to the desired destination.

When the passenger 160 does not need to intervene the vehicle's operation anymore, the passenger 160 may end the intervention session by sending an end session request 232. The security agent 110 may authenticate the request and determine whether the vehicle is ready to be switched back to automatic control mode based on the vehicle's current status after receiving the end session request 232. If the vehicle is suitable to be switched back to automatic driving mode, the security agent 110 may report the ending of the intervention session by sending an end session request report 236 to the SOC and then disable the intervention session. Meanwhile, the security agent 110 may send an end session reply 238 back to the user control panel 120 to notify the passenger 160 that the intervention session is terminated, and the vehicle 105 now is operated at the automatic driving mode. The security agent 110 may further create and send an end session reply report 240 to the SOC regarding the termination of the intervention session. The state flag may be disabled when the intervention session is terminated. The remote operator 170 may stop monitoring the intervention session after receiving the acknowledge of the termination of the intervention session.

In some embodiments, when the security agent 110 communicates with the user control panel 120 or the server 150, the security agent 160 may authenticate the identities of the user control panel 120 and the server 150. The authentication may be conducted using any authentication method, include but not limited to, a public key infrastructure (PKI) mechanism.

Figure 3:
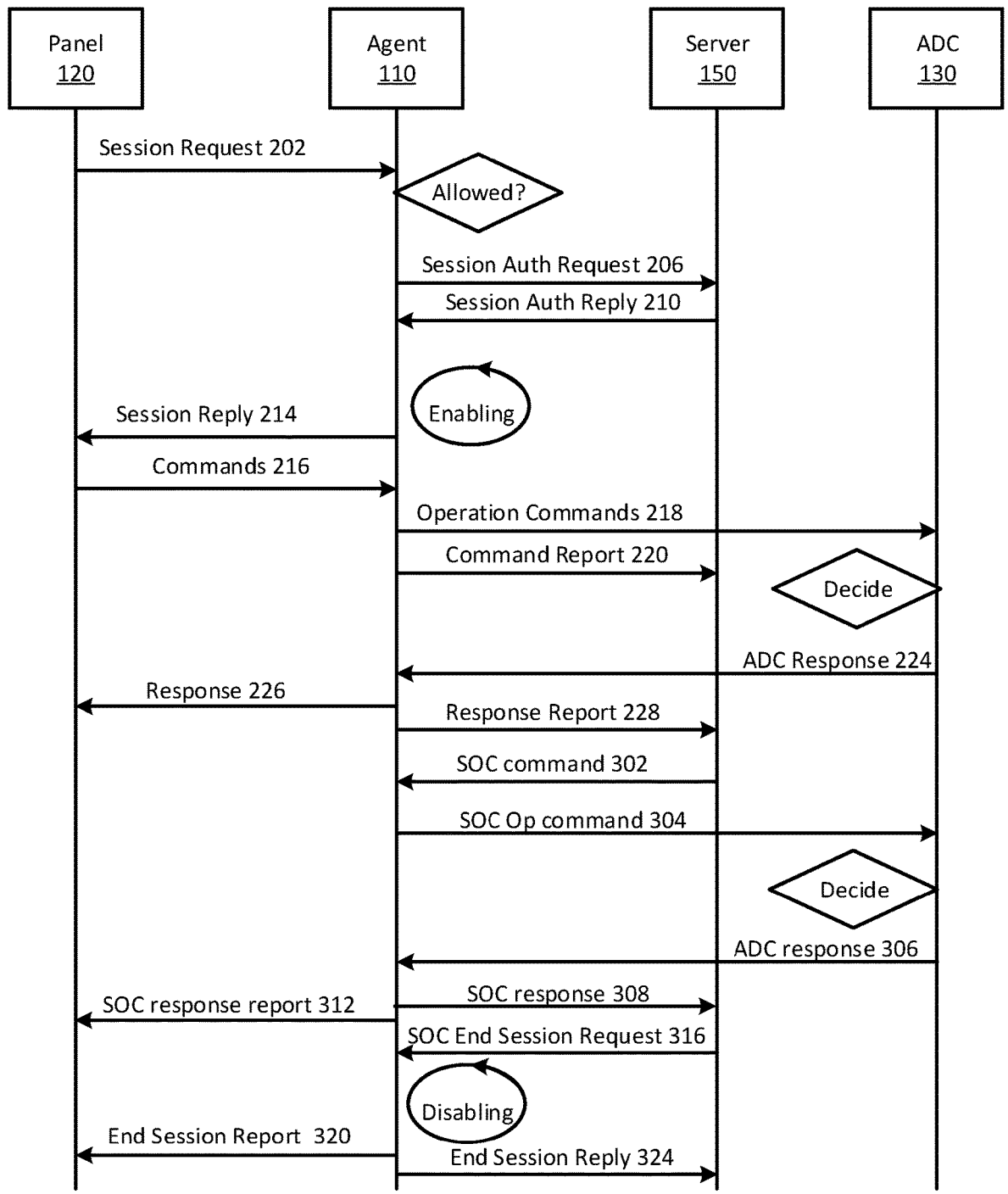
FIG. 3 illustrates a flow chart of a passenger requested intervention session.

FIG. 3 shows a flow chart of a passenger initiated intervention session according to another embodiment. In some embodiments, the remote operator 170 has been monitoring the intervention session via the server 150, from sending the intervention session authorization response until the receiving the end session report. If the remote operator does not find inappropriate operations, the remote operator 170 does not get involved in the intervention session. If the remote operator 170 find inappropriate actions or suspicious behaviors, the remote operator 170 may notify the ADC 130 and provide additional commands or information for the ADC 130 to make decisions. The remote operator 170 may override the passenger commands or take over the intervention session.

In some embodiments, when the passenger 160 wants to intervene the operation of the vehicle 105, the passenger may send an intervention session by sending an intervention session request 202 for remote intervention to the security agent 110. The request may be entered at a terminal, i.e., by pressing a "start" icon on the user control panel 120, by voice commend through a built-in microphone, or any other suitable methods through any other devices. The security agent 110 may receive the user input including the intervention session request 202 on the user interface at the terminal.

After the security agent 110 receives the intervention session request 202, the security agent 110 may review the received intervention session request 202 and check a current state flag for intervention sessions to determine whether the passenger 160 is already allowed to establish a remote intervention session under the current vehicle status. Along with the intervention session request 202, the passenger 160 may provide a digital key, a security code, a password, or a fingerprint in the intervention session request 202, to let the security agent 110 or the SOC to authenticate the passenger 160 who is requesting to establish a remote intervention session. If the passenger 160 has signed in before sending the intervention session request, the security agent 110 may have already authenticated the identity of the passenger 160 during signing into the vehicle. If the security agent 110 determines that the passenger 160 has already established an intervention session, it may directly use the intervention session to take commands from the passenger 160. If the security agent 110 determines that the passenger 160 has not established a remote intervention session, the security agent 110 may forward the received intervention session request 202 and the information associated with the current vehicle status to the server 150 by sending an intervention session authorization request 206 to the server 150 (e.g., a security operation center (SOC)). The intervention session authorization request 206 may comprise the received intervention session request 202 (including the digital certificate of the vehicle) and the information associated with the current vehicle status. The server 150 may evaluate the received intervention session authorization request 206 and other vehicle information or user profile who has checked into the vehicle to decide whether to authorize the intervention operation for the passenger 160.

If the SOC authorizes the intervention session authorization request 206, the SOC may send an intervention session authorization reply 210 to the security agent 110 to allow the security agent 110 to establish the remote intervention session for the passenger 160, and the SOC may start monitoring the intervention operations. If the SOC decide not to authorize the intervention session, the intervention session authorization reply 210 may notify the security agent 110 to reject the intervention session request 202. The communications between the server 150 and other parties in the system are through a secured encrypted connection, to prevent undesired interruptions, such as interruptions from hackers. The intervention session authorization reply 210 may comprise an instruction to initiate the intervention session, and/or a digital certificate for the security agent 110 to authenticate the identity of the server 150. Alternatively, the authentication of the server 150 may have been completed when the secure encrypted communication channel between the security agent 110 and the server 150 was established.

The intervention session with the passenger 160 may be established, the security agent 110 may send an intervention session reply 214 to the passenger 160. The security agent 110 may provide a user interface associated with the intervention session based on the received instruction from the server 150, for display the intervention session reply 214. The user interface may be provided on various devices, such as on the terminal associated with the vehicle 105 (e.g., user control panel 120 or passenger's mobile device application). Meanwhile, a state flag may be set to indicate that the intervention session is authorized and enabled in response to the received intervention session authorization reply 210. The intervention session reply 214 may be sent to the user control panel 120 to notify the passenger 160 that the intervention session request 202 has been authorized, so that the passenger 160 can start sending commands 216 to the security agent 110, wherein the commands 216 may include authentication information and high level commands, such as turning left/right, moving forward/backward, accelerating/decelerating, or stop. The user interface may be provided on the user control panel 120 for displaying the intervention session reply 214 or for entering the high-level commands. The user interface may be provided on other devices, such as video devices, audio devices, or any other suitable devices.

The security agent 110 may detect the user input and forward the user interaction, such as operation commands 218, to the ADC 130 of the vehicle 105, and create and send a command report 220 to the server 150 at the SOC. The operation commands 218 may be a portion of the commands 216 that contains the high level commends for directing the vehicle 105. The command report 220 may include the operation commands 218 and the information associated with the vehicle status. The ADC 130 may make a decision associated with the operation of the vehicle 105 based on the received operation commands 218, other information collected by the sensors of the vehicle 105, and information associated with the vehicle's current status. If the ADC 130 decide to follow the received operation commands 218, it may convert the received high level operation commands 218 to corresponding low level CAN bus commands and send the low-level CAN bus commands to the ECUs 140 to operate the vehicle 105. The ADC 130 may communicate with the ECUs 140 through the CAN bus or any other bus. If the ADC 130 decide that it is not safe to follow the commands 218, the ADC 130 may reject the operation commands 218.

After the ADC 130 made the final decision, it may send an ADC response 224 to the security agent 110 to notify the security agent 110 about the vehicle's operations together with the updated status of the vehicle 105. The security agent 110 may forward at least a part on the information in the ADC response 224, such as a response 226, to the passenger 160, and creates and sends a response report 228 to the SOC. The response 226 may be shown on the user control panel 120 to notify the passenger 160 that the operation commands 218 are approved or rejected by the ADC 130, and the current status of the vehicle 105 (i.e., the speed, location, orientation) The response report 228 may comprise at least the ADC response 224 and/or the vehicle current status information.

The passenger 160 may review the response 226 and the vehicle current status on the user control panel 120. Alternatively, the response 226 may be delivered to the passenger 160 by voice through a speaker in the user control panel 120 or the vehicle 105, or in any other suitable methods. The passenger 160 may evaluate the response 224 and the vehicle current status to decide his next action.

The remote operator 170 may have been monitoring the intervention session via the server 150 since the intervention session request 202 was granted. During the monitoring, if the remote operator 170 spots any inappropriate behavior, the remote operator may send a SOC command 302 to override the behavior through the security agent 110.

For example, in the above scenario, the passenger 160 send an "U-turn" command and the ADC 130 decides to make the U-turn based on the current vehicle status. The response report 228 may be sent to the server 150 to notify the SOC about its decision. However, for an instance, the remote operator 170 may notice, from the rear camera of the vehicle 105 that, an ambulance is approaching the intersection from behind. In this case, the remote operator 170 may send the SOC command 302 to the ADC 130 to override the commands 218. In other words, the SOC command 302 may have a higher priority than the user input command 218. The security agent 110 create and send a SOC operation command 304 to ADC 130. The SOC operation command 304 may comprise the received SOC command 302, which may include commands, such as moving forward, turning right, or pullover to the right. The ADC 130, based on the SOC operation command 304 along with other information including images or other information from the sensors, may make an updated decision associated with operation of the vehicle 105. In other words, the ADC 130 may again override the SOC command 302 based on the latest information from the sensors. For example, the ADC 130 may decide that the vehicle is almost at the intersection and has more than enough time to make the U-turn before the ambulance reaches the intersection. Or the ADC 130 may decide to change lanes and yield to the ambulance. The ADC 130 may create and send an ADC response 306 to notify its decision in response to the SOC operation command 304, wherein the ADC response 306 may comprise the ADC decision, operation, and the most updated vehicle information. The security agent 110 forwards at least a part of the received ADC response 306 to the SOC as a SOC response 308 to notify the decision of the ADC 130 regarding the SOC operation command 304, and create and send a SOC response report 312 to the user control panel 120 for display to the passenger 160 about the updated decision from the ADC 130.

As another example, the passenger 160 may direct the vehicle 105 to go off the road or circle around in a rough unpaved area. The remote operator 170 may find out about this abusive behavior and would like to take over control of the vehicle 105. In this case, the remote operator 170 may send the SOC command 302 to the security agent 110. The SOC command 302 may comprise the SOC operation command 304. The ADC 130 may decide to instruct the vehicle 105 to go back to the paved road to prevent damages to the vehicle 105.

The SOC may end the intervention session by sending an SOC end session request 316 to the security agent 110, when the commands 216 have been executed or to take over the control of the vehicle 105 for interrupting the abusive behavior. The security agent 110 may authenticate the request and determine whether the vehicle is ready to be switched back to automatic control mode based on the vehicle's current status after receiving the SOC end session request 316. If the vehicle is suitable to be switched back to automatic driving mode, the security agent 110 may disable the intervention session and report the ending of the intervention session by sending an end session request report 320 to the passenger 160 to notify the passenger 160 that the SOC has requested to end the intervention session. Meanwhile, the security agent 110 may send an end session reply 324 back to the SOC to notify that the intervention session is terminated, and the vehicle 105 now is operated at the automatic driving mode. The state flag may be disabled when the intervention session is terminated. The remote operator 170 may stop monitoring the intervention session after receiving the acknowledge of the termination of the intervention session.

Alternatively, when the passenger 160 does not need to intervene the vehicle's operation anymore, the passenger 160 may end the intervention session by sending an end session request 232, as shown in FIG. 2. The security agent 110 may determine whether the vehicle is ready to be switched back to automatic control mode based on the vehicle's current status after receiving the end session request 232. If the vehicle is suitable to be switched back to automatic driving mode, the intervention session is terminated, and the vehicle 105 is operated at the automatic driving mode. The state flag may be disabled when the intervention session is terminated. The remote operator 170 may stop monitoring the intervention session.

Figure 4:
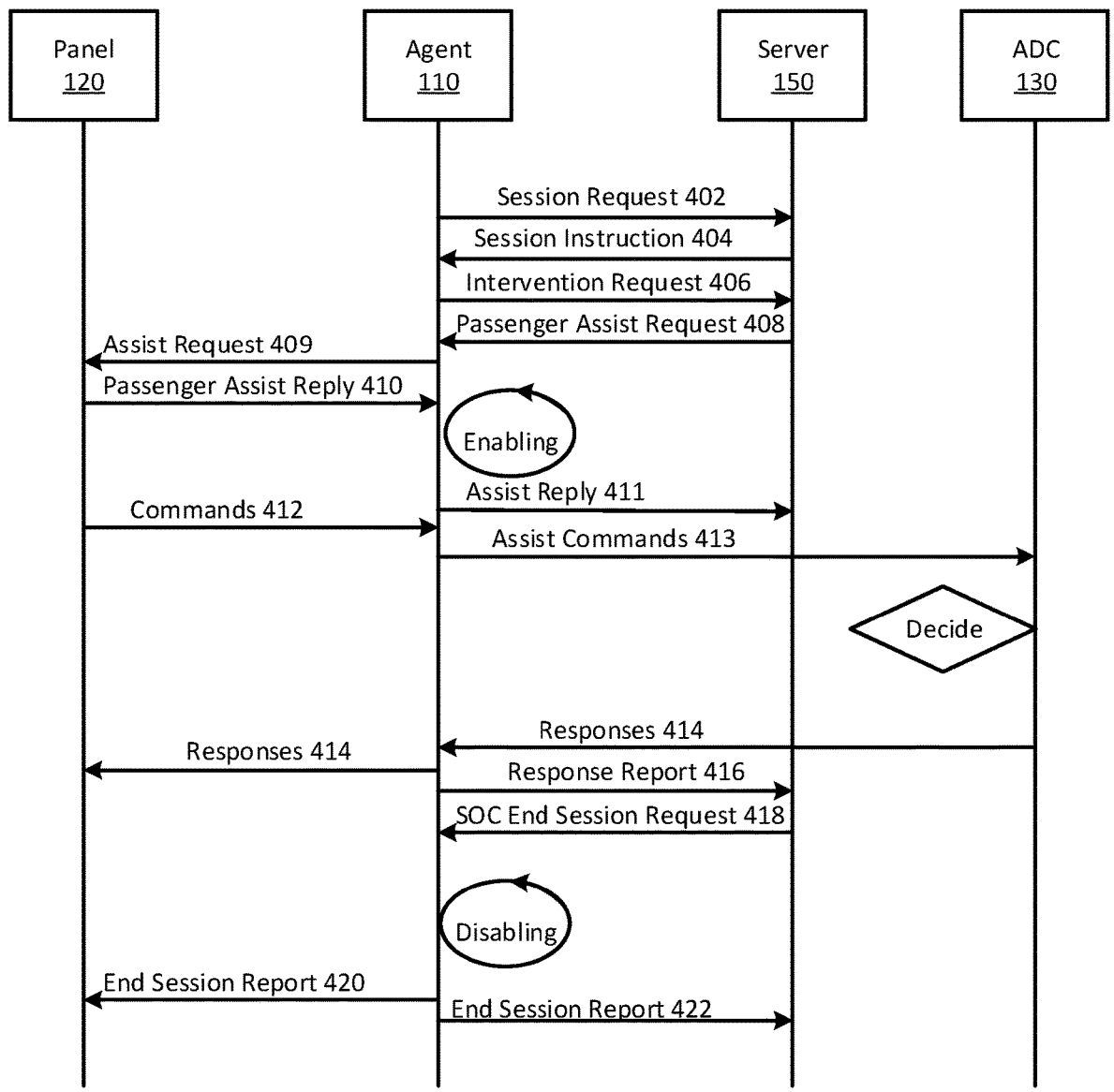
FIG. 4 illustrates a flow chart of an operator initiated intervention session.

FIG. 4 shows a flow chart of a SOC initiated intervention session. In some embodiments, in the case that the vehicle 105 may have difficulty to navigate to the desired destination, if the remote operator 170 determines that the passenger 160 may be able to assist the vehicle 105 for completing the tasks, the SOC may request the passenger to intervene the vehicle operations by initiating an intervention session. If the passenger 160 agrees to assist, the security agent 110 may enable the intervention from the passenger 160 and receive commands from the passenger 160.

In some embodiments, the security agent 110 may send an intervention session request 402 to the server 150 or the SOC through the encrypted connection. The intervention session request 402 may ask the SOC to initiate an intervention session. Upon receiving the intervention session request 402 from the security agent 110, the SOC may authorize the intervention session with respect to the intervention session request 402 by sending an intervention session instruction 404.

After the security agent 110 receives the intervention session instruction 404 from the server 150 at the SOC, the security agent 110 may authenticate the identity of the server 150 by, for example, using PKI mechanism. Alternatively, the authentication of the server 150 may have been completed when the secure encrypted communication channel between the security agent 110 and the server 150 was established. If the identity of a digital certificate of the intervention session instruction 404 is authenticated, the security agent 110 may send an intervention request 406 to the SOC to request commands from the SOC, wherein the intervention request 406 may contain the current vehicle status information. The SOC may determine whether the passenger 160 is capable to assist the operations of vehicle 105 under the current vehicle status. When the SOC determines that the passenger 160 may be able to assist, the SOC may send a passenger assistance request 408 to the passenger 160 through the security agent 110. The SOC may determine the capability of the passenger 160 for assisting the operations of the vehicle 105 based on vehicle information and/or passenger profile. For example, the passenger profile may include information such as whether the passenger has a valid driver's license or have sufficient experience to drive under the current road condition. The vehicle information may include the vehicle condition, such as the images/videos captured by the vehicle cameras, information collection by various sensors of the vehicle, location/orientation of the vehicle, or other driving conditions of the vehicle.

The security agent 110 may authenticate the received passenger assistance request 408 and forward at least a part of the request to the passenger 160 as an assistance request 409. The passenger 160 may evaluate the received assistance request 409. If the passenger 160 agrees to assist, he can acknowledge the agreement to assist by sending a passenger assist reply 410. The passenger 160 may communicate with the security agent 110 through various manners, such as, but not limited to, a text message displayed on the user control panel 120, a voice message through a speaker or microphone, or any other suitable manners. Optionally, the security agent 110 may select one or more of the communication manners to communicate with the passenger 160 based on the environment information, the vehicle status, or the passenger profile. For example, the assistance request 409 may be displayed to the passenger 160 through the user interface provided on the user control panel 120, and the passenger 160 may send the passenger assist reply 410 by pressing an icon on the user control panel 120.

If the security agent 110 receives the passenger assist reply 410 and the vehicle status is suitable for the passenger 160 to intervene, the security agent 110 may enable the system to receive commands from the passenger 160. Before enabling the system to receive commands from the passenger 160, the security agent 110 may authenticate the identity of the passenger 160, by a digital key, for example, to make sure the commands will be from the authorized passenger 160. Such the authentication information may be included in the passenger assist reply 410. The authentication may also be conducted by, but not limited to, fingerprints, voice/face recognition, or passwords. The intervention session now is established. The security agent 110 may forward at least a part of the passenger assist reply 410 as the assist replay 411 to the server 150 at the SOC to notify the SOC that the passenger assistance is enabled. At this time, the passenger can send commands 412 to the security agent 110. The passenger 160 may send at least a portion of the commands 412 associated with operation of the vehicle 105, as the assist commands 413, to the security agent 110 in various ways. The assist commands 413 may comprise instructions to the ADC 130 (e.g., right turn) or environment information that is determined by the passenger 160 (e.g., whether the traffic light is green). For example, the passenger 160 can use the user control panel 120 shown in FIG. 5 to direct the vehicle 105.

Figure 5:
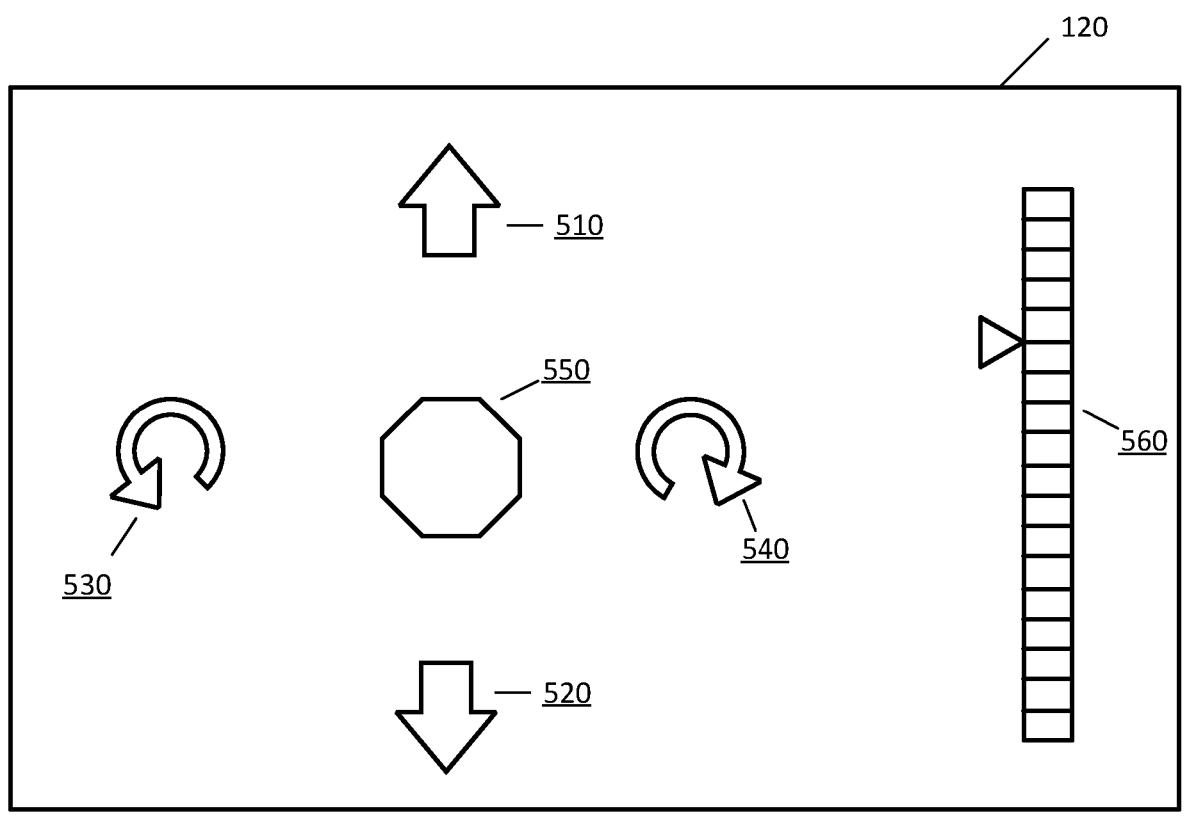
FIG. 5 illustrates an example of a user control panel.

FIG. 5 shows an example of a user control panel 120 according to some embodiments. The user control panel 120 may include multiple predefined icons, such as forward 510, backward 520, left turn 530, right turn 540, and stop 550. The user control panel 120 may also include a speed adjuster 560 to change speed of the vehicle. The passenger 160 can direct the vehicle 105 to go right, left, forward, or backward by pressing one of the predefined icons. When press the right/left buttons, each click may turn the vehicle at a certain angle. For example, to make a 90 degree right turn, the passenger 160 may click the Right button 6 times, if each click turns a 15 degree angle. Alternatively, the passenger can use a finger to draw a desired right/left turn angle on the control panel. The forward/backward button may incorporate speed-control commands. When the vehicle moves forward, a backward command may cause the vehicle to slow down, stop, and back up. The user control panel 120 may also include a text window for typing text, such as a new address of a destination. The user control panel 120 may also include other elements, such as a build-in speaker, a microphone, one or more signal lights or buttons. The user control panel 120 may include a display window for displaying images/videos captured by a rear camera, for example. As discussed above, the communication between the passenger 160 and the security agent 110 may be performed by touching screen, text messages, voice commands, and/or pressing buttons or signal lights.

Once the security agent 110 receives and verifies the commands 412, the security agent 110 may forward the commands 412 to the ADC 130 for operating the vehicle 105. The commands 412 may include one or more high level commands. The ADC may convert the received assist commands 412 to low level commands to operate the vehicle 105. For example, the vehicle 105 may not able to find the destination in the last few feet approaching the address. The passenger may slow down the vehicle 105 by adjusting the speed adjuster 560 on the user display panel 120 and touch the right turn icon 540 to direct the vehicle 105 to turn right when the passenger 160 spots the destination. The passenger 160 may also give a voice command of "find parking" to request the ADC 130 to locate a parking space, when the passenger 160 sees the parking garage of the destination is full. For each of the assist commands 412, the ADC 130 may execute the command and generate a corresponding response.

The ADC 130 may make a decision based on the received assist commands 412 and other information collected by the sensors of the vehicle 105. The other information may include environment information, vehicle status, location/orientation of the vehicle 105, and/or weather information. Based on the received assist commands 412, collected other information, and the vehicle's current status, the ADC 130 may evaluate whether it is safe to follow the assist commands 412. The ADC 130 may further convert the received high level assist commands 412 to low level CAN bus commands and send the low-level CAN bus commands to the ECUs 140 for operating the vehicle 105 through the CAN bus or any other bus. If the ADC 130 decide that it is not safe to follow the commands 218, the ADC 130 may notify the passenger 160 regarding its decision included in a response 414 and reported to the passenger 160.

The responses 414 may be sent to the passenger 160 through the security agent 110. For example, the responses 414 may be displayed on the user control panel to notify the passenger 160 that the execution result of the command, such as "failed" or "successful." The responses 414 may also cause an updated location of the vehicle to be indicated on a background navigation map in the user control panel. The area covered by the background navigation map may be adjusted based on the updated location of the vehicle.

Optionally, the current status of the vehicle 105 may be sent to the passenger 160 at the user panel 120 along with the responses 414. The passenger 160 may review the responses 414 and the updated vehicle current status on the user control panel 120. Alternatively, the responses 414 may be delivered to the passenger 160 by voice through a speaker, or in any other suitable methods. The passenger 160 may change the existing commands, or send additional commands, after reviewing the responses 414 and the updated vehicle current status.

While the security agent 110 forwards the responses 414 to the passenger 160, the security agent 110 may also create and send a response report 416 to the SOC to notify SOC the decision of ADC 130. The SOC may monitor the progress of the intervention session by checking the response report 416, passenger assist reply 410, and/or other collected information. During the monitoring, if the SOC find out any inappropriate operation, the SOC may warn or interrupt the operations of the vehicle 105, as described in FIG. 3.

Once the response report 416 indicates that the commands are all executed, and the vehicle 105 can be operated without the passenger assistance, the SOC may determine that the intervention tasks are completed and send a SOC end session request 418 to the security agent 110. The security agent 110 may further evaluate whether the vehicle 105 is ready to be switched back to automatic control mode based on the vehicle's current status after receiving the SOC end session request 418. If the vehicle is suitable to be switched back to automatic driving mode, the security agent 110 may disable the intervention session and report to the passenger 160 by generating and sending an end session report 420 to the user control panel 120 to notify the termination of the intervention session. The vehicle 105 is then operated at the automatic driving mode. The state flag may be disabled when the intervention session is terminated. The end session report 420 may be reported to the passenger 160 by displaying the message on the user control panel 120. The passenger 160 will not be able to send any command to the security agent 110 to operate the vehicle once the intervention session is closed. The security agent 110 may create and send a SOC end session report 422 to the server 150 to report the intervention session closure to the SOC, wherein the SOC end session report 422 may comprise the termination of the intervention session, the most updated vehicle status, and/or the end session report 420 sent to the passenger 160.

Figure 6:
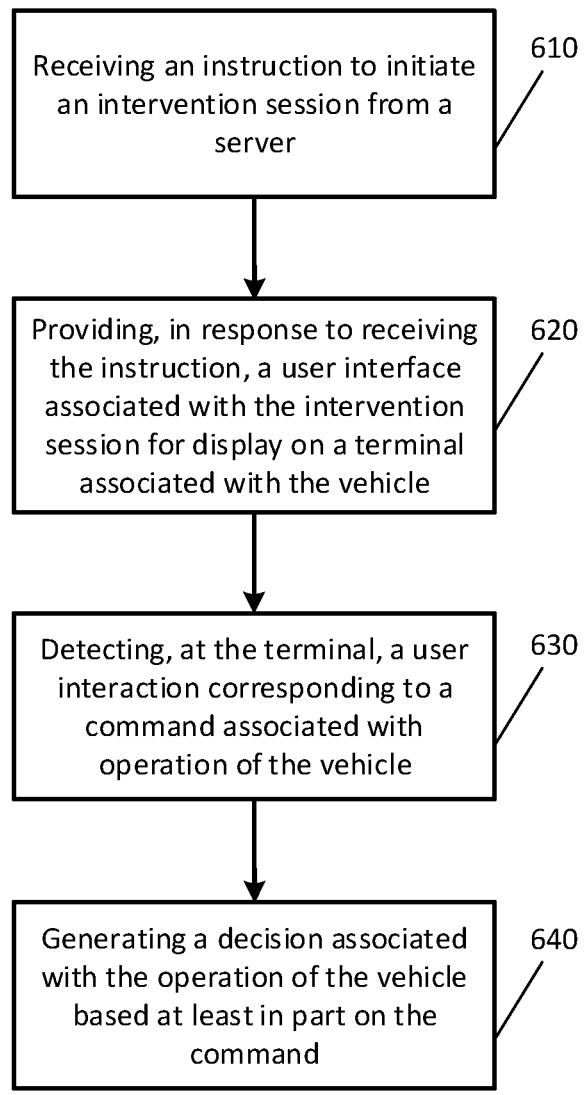
FIG. 6 illustrates a flow chart of a method for managing user intervention.

FIG. 6 is a flow chart of a method for managing user intervention according to some embodiments. The method 600 comprises a plurality of operations, which includes an operation 610 of receiving an instruction to initiate an intervention session from a server, an operation 620 of providing a user interface associated with the intervention session for display on a terminal associated with the vehicle in response to receiving the instruction, an operation 630 of detecting a user interaction corresponding to a command associated with operation of the vehicle at the terminal, and generating a decision associated with the operation of the vehicle based at least in part on the command.

Figure 7:
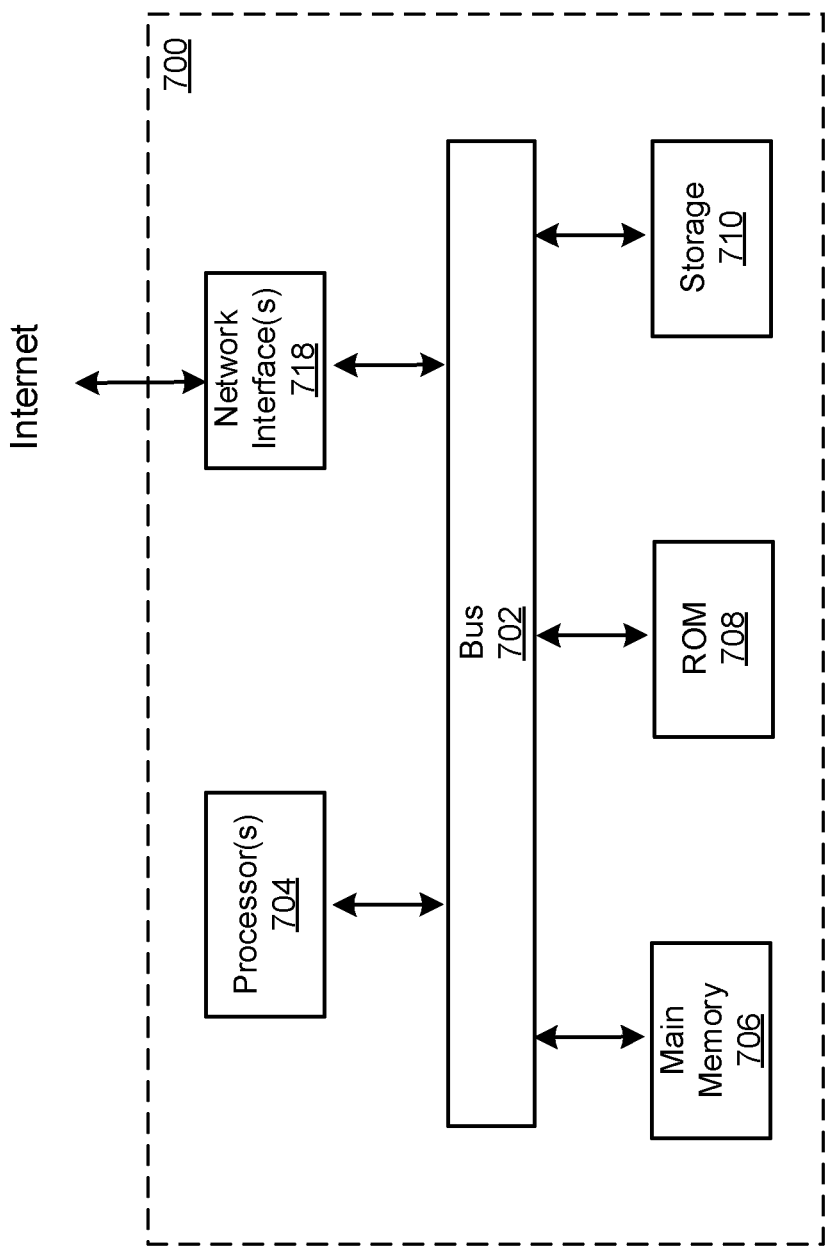
FIG. 7 illustrates a block diagram of a computer system in which any of the embodiments described herein may be implemented.

FIG. 7 is a block diagram a block diagram of a computer system in which any of the embodiments described herein may be implemented. The system 700 may correspond to one or more electronic devices associated with the system 100 as illustrated by FIG. 1. The computer system 700 includes a bus 702 or other communication mechanism for communicating information, one or more hardware processor 704 coupled with the bus 702 for processing information. The hardware processor 704 may be, for example, one or more general purpose microprocessors. The hardware processor 704 may correspond to the processor 704 described above.

The computer system 700 also includes a main memory 706, such as a random access memory (RAM), cache and/or other dynamic storage devices, coupled to bus 702 for storing information and instructions to be executed by the processor 704. The main memory 706 also may be used for storing temporary variables or other intermediate information during execution of instructions to be executed by the processor 704. Such instructions, when stored in storage media accessible to the processor 704, render the computer system 700 into a special-purpose machine that is customized to perform the operations specified in the instructions. The computer system 700 further includes a read only memory (ROM) 708 or other static storage device coupled to the bus 702 for storing static information and instructions for the processor 704. A storage device 710, such as a magnetic disk, optical disk, or USB thumb drive (Flash drive), etc., is provided and coupled to bus 702 for storing information and instructions. The main memory 706, the ROM 708, and/or the storage device 710 may correspond to the main memory 706 described above.

The computer system 700 may implement the techniques described herein using customized hard-wired logic, one or more ASICs or FPGAs, firmware and/or program logic which in combination with the computer system causes or programs the computer system 700 to be a special-purpose machine. According to one embodiment, the techniques herein are performed by the computer system 700 in response to the processor 704 executing one or more sequences of one or more instructions contained in the main memory 706. Such instructions may be read into the main memory 706 from another storage medium, such as the storage device 710. Execution of the sequences of instructions contained in the main memory 706 causes the processor 704 to perform the process steps described herein. In alternative embodiments, hard-wired circuitry may be used in place of or in combination with software instructions.

The main memory 706, the ROM 708, and/or the storage device 710 may include non-transitory storage media. The term "non-transitory media," and similar terms, as used herein refers to media that store data and/or instructions that cause a machine to operate in a specific fashion. Such non-transitory media may comprise non-volatile media and/or volatile media. Non-volatile media includes, for example, optical or magnetic disks, such as the storage device 710. Volatile media includes dynamic memory, such as the main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes one or more communication interface 718 coupled to the bus 702. The communication interface 718 provides a two-way data communication coupling to one or more network links that are connected to one or more local networks. For example, the communication interface 718 may be an integrated services digital network (ISDN) card, cable modem, satellite modem, or a modem to provide a data communication connection to a corresponding type of telephone line. As another example, the communication interface 718 may be a local area network (LAN) card to provide a data communication connection to a compatible LAN (or WAN component to communicated with a WAN). Wireless links may also be implemented. In any such implementation, the communication interface 718 sends and receives electrical, electromagnetic or optical signals that carry digital data streams representing various types of information.

The computer system 700 can send messages and receive data, including program code, through the network(s), network link and the communication interface 718. In the Internet example, a server might transmit a requested code for an application program through the Internet, the ISP, the local network and the communication interface 718.

The received code may be executed by the processor 704 as it is received, and/or stored in the storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:
   receiving, by a computer device from a terminal associated with a vehicle, a request of a user for initiating an intervention session;
   initializing, by the computer device, the intervention session;
   displaying, by the computer device, a user interface associated with the intervention session on the terminal associated with the vehicle;
   after the intervention session is initialized, detecting, by the computer device from the user interface on the terminal, a user-level command for operating the vehicle;
   sending, by the computer device, the user-level command and sensor data collected by one or more sensors associated with the vehicle to a server;
   receiving, by the computer device from the server, a server command that overrides the user-level command based on the sensor data;
   in response to receiving the server command, automatically determining, by the computer device based on latest sensor data and the server command, a vehicle-control command for operating the vehicle that overrides the server command;
   sending, by the computer device, the vehicle-control command to the server as a response to the received server command;
   receiving, by the computer device from the server, a response report and displaying the response report on the user interface to a user, wherein the response report comprises the vehicle-control command; and
   generating, by the computer device based on the vehicle-control command for operating the vehicle, a bus-level command for operating the vehicle.

2. The method of claim 1, wherein the initializing of the intervention session comprises:
   forwarding, by the computer device, the request and information associated with a status of the vehicle to the server; and
   receiving, by the computer device from the server, an instruction that authorizes the initiation of the intervention session.

3. The method of claim 1, wherein the server command comprises a digital certificate, and wherein the method further comprises:
   verifying an identity of the server based on the digital certificate.

4. The method of claim 1, wherein the initializing of the intervention session comprises:
   determining whether the user has already been granted an authorized intervention session; and
   in response to determining that the user has already been granted the authorized intervention session, reusing the authorized intervention session as the intervention session.

5. The method of claim 1, wherein the vehicle-control command for operating the vehicle achieves a same effect as the user-level command.

6. The method of claim 1, wherein the user-level command comprises:
   instructions associated with a movement direction of the vehicle;
   instructions associated with a speed of the vehicle; or
   instructions associated with a destination for navigation of the vehicle.

7. The method of claim 1, wherein the sensor data comprise:
   environmental information; and
   speed, direction, elevation, and orientation of the vehicle.

8. The method of claim 1, further comprising:
   receiving, at the terminal, a user input comprising a request for terminating the intervention session;
   terminating the intervention session in response to the received user input, wherein the terminating comprises disabling a state flag that indicates the intervention session is authorized; and
   sending a report to the server indicating that the intervention session has been terminated.

9. The method of claim 1, further comprising:
   receiving, from the server, a command to terminate the intervention session; and
   terminating the intervention session in response to the command from the server, wherein the terminating comprises disabling a state flag that indicates the intervention session is authorized.

10. A system for managing user intervention, comprising a processor and a non-transitory computer-readable storage medium storing instructions executable by the processor to cause the system to perform operations comprising:
    receiving, from a terminal associated with a vehicle, a request of a user for initiating an intervention session;
    initializing the intervention session;
    displaying a user interface associated with the intervention session on the terminal associated with the vehicle;
    after the intervention session is initialized, detecting, from the user interface on the terminal, a user-level command for operating the vehicle;
    sending the user-level command and sensor data collected by one or more sensors associated with the vehicle to a server;
    receiving, from the server, a server command that overrides the user-level command based on the sensor data;
    in response to receiving the server command, automatically determining, based on latest sensor data and the server command, a vehicle-control command for operating the vehicle that overrides the server command;
    sending the vehicle-control command to the server as a response to the received server command;
    receiving, from the server, a response report and displaying the response report on the user interface to a user, wherein the response report comprises the vehicle-control command; and
    generating, based on the vehicle-control command for operating the vehicle, a bus-level command for operating the vehicle.

11. The system of claim 10, wherein the initializing of the intervention session comprises:

forwarding the request and information associated with a status of the vehicle to the server; and receiving, from the server, an instruction that authorizes the initiation of the intervention session.

12. The system of claim 10, wherein the initializing of the intervention session comprises:
    determining whether the user has already been granted an authorized intervention session; and
    in response to determining that the user has already been granted the authorized intervention session, reusing the authorized intervention session as the intervention session.

13. The system of claim 10, wherein the vehicle-control command for operating the vehicle achieves a same effect as the user-level command.

14. The system of claim 10, wherein the operations further comprise:
    receiving, at the terminal, a user input comprising a request for terminating the intervention session;
    terminating the intervention session in response to the received user input, wherein the terminating comprises disabling a state flag that indicates the intervention session is authorized; and
    sending a report to the server indicating that the intervention session has been terminated.

15. The system of claim 10, wherein the operations further comprise:
    receiving, from the server, a command to terminate the intervention session; and
    terminating the intervention session in response to the command from the server, wherein the terminating comprises disabling a state flag that indicates the intervention session is authorized.

16. A non-transitory computer-readable storage medium configured with instructions executable by one or more processors to cause the one or more processors to perform operations comprising:
    receiving, from a terminal associated with a vehicle, a request of a user for initiating an intervention session;
    initializing the intervention session;
    displaying a user interface associated with the intervention session on the terminal associated with the vehicle;
    after the intervention session is initialized, detecting, from the user interface on the terminal, a user-level command for operating the vehicle;
    sending the user-level command and sensor data collected by one or more sensors associated with the vehicle to a server;
    receiving, from the server, a server command that overrides the user-level command based on the sensor data;
    in response to receiving the server command, automatically determining, based on latest sensor data and the server command, a vehicle-control command for operating the vehicle that overrides the server command;
    sending the vehicle-control command to the server as a response to the received server command;
    receiving, from the server, a response report and displaying the response report on the user interface to a user, wherein the response report comprises the vehicle-control command; and
    generating, based on the vehicle-control command for operating the vehicle, a bus-level command for operating the vehicle.

17. The non-transitory computer-readable storage medium of claim 16, wherein the initializing of the intervention session comprises:
    forwarding the request and information associated with a status of the vehicle to the server; and
    receiving, from the server, an instruction that authorizes the initiation of the intervention session.

18. The non-transitory computer-readable storage medium of claim 16, wherein the initializing of the intervention session comprises:
    determining whether the user has already been granted an authorized intervention session; and
    in response to determining that the user has already been granted the authorized intervention session, reusing the authorized intervention session as the intervention session.

19. The non-transitory computer-readable storage medium of claim 16, wherein the vehicle-control command for operating the vehicle achieves a same effect as the user-level command.

20. The non-transitory computer-readable storage medium of claim 16, wherein the operations further comprise:
    receiving, at the terminal, a user input comprising a request for terminating the intervention session;
    terminating the intervention session in response to the received user input, wherein the terminating comprises disabling a state flag that indicates the intervention session is authorized; and
    sending a report to the server indicating that the intervention session has been terminated.

* * * * *